United States Patent
Sasser et al.

[11] Patent Number: 6,102,471
[45] Date of Patent: Aug. 15, 2000

[54] AUTOMATIC HOLD-OPEN MECHANISM FOR A CANOPY OF A MACHINE

[75] Inventors: Jamison T. Sasser, Apex; Reid W. Waitt, Willow Springs; Andrew S. Miller, Sanford; John R. Beaton, Apex, all of N.C.

[73] Assignee: Caterpillar S.A.R.L., Geneva, Switzerland

[21] Appl. No.: 09/166,261

[22] Filed: Oct. 5, 1998

[51] Int. Cl.[7] ............................... B60J 7/08; B60J 7/185; B62D 33/067; B62D 33/06

[52] U.S. Cl. ............................... 296/190.05; 296/190.04; 296/190.01; 180/89.14; 292/DIG. 5

[58] Field of Search ......................... 296/190.05, 190.04, 296/190.01, 190.06, 190; 180/89.14; 292/DIG. 5, 262, 263, 275, 277, 278, 338, DIG. 14

[56] References Cited

U.S. PATENT DOCUMENTS

| | | | |
|---|---|---|---|
| 4,253,700 | 3/1981 | Di Francescantonio | 296/190.05 |
| 4,811,983 | 3/1989 | Watts et al. | 296/190 |
| 5,547,244 | 8/1996 | Lee | 296/102 |

FOREIGN PATENT DOCUMENTS

| | | | |
|---|---|---|---|
| 358128974 | 9/1983 | Japan | 296/190.05 |
| 1584768 | 2/1981 | United Kingdom . | |

*Primary Examiner*—Joseph D. Pape
*Assistant Examiner*—Greg Blankenship
*Attorney, Agent, or Firm*—Diana L. Charlton

[57] ABSTRACT

A hold-open mechanism for a canopy of a skid steer loader machine is described herein. The hold-open mechanism includes a support block secured to a frame of the machine, a wedging block secured to the canopy, and a prop device. A bracket is connected at a body portion to the support block and extends therefrom for termination at a head portion. A pair of arms extend perpendicularly from the body portion. The prop device has a bar with first and second end portions and a lever connected to the bar and supported within the arms of the bracket. A biasing spring is positioned on the bracket adjacent the bar for biasing the prop device to a working location from a resting location. In a closed position, the canopy is forced against the biasing action of the spring to maintain the prop device in the resting location. The movement of the canopy from the closed position to an open position automatically biases the prop device to the working location wherein the first end portion of the bar is seated on the support block and the second end portion abuts the wedging block to hold the canopy in the open position.

18 Claims, 8 Drawing Sheets

Fig. 1

Fig_2_

Fig_3

Fig_4_

Fig_5_

Fig_6_

AUTOMATIC HOLD-OPEN MECHANISM FOR A CANOPY OF A MACHINE

TECHNICAL FIELD

This invention relates generally to a mechanism for holding a canopy of a skid steer loader machine in an open position and more particularly to the ability to automatically engage the mechanism when the canopy is moved from a closed position to the open position while incorporating an improved structural design to withstand loading.

BACKGROUND ART

It is well known that a machine, such as a skid steer loader, typically includes a canopy pivotably mounted to a frame of the machine and mechanically assisted by a gas-charged lift cylinder for movement between closed and open positions. The open position of the canopy allows for access to interior components during maintenance or repair. Therefore, it may be important to hold the canopy in the open position for extended periods of time.

A design disclosed in U.S. Pat. No. 4,811,983 issued to Vern C. Watts, et. al., on Mar. 14, 1989 utilizes a gas spring incorporating a latching stop mechanism. The stop mechanism includes a stop tube mounted to a piston rod and telescopically cooperable with a cylinder body. Two parallel slots extend in a transverse direction through the stop tube. A stop slide has a pair of legs which are adapted to slide within the slots of the stop tube. A release portion of the stop slide is sized to permit the cylinder body to pass between the legs, while a stop portion is sized to prevent the cylinder body from passing between the legs. A spring urges the stop slide toward a stop position at which the stop portion of the stop slide is aligned with the cylinder body when the piston is extended so that the cab enclosure is latched in a tilt-back position. The incorporation of the stop mechanism on the gas spring, however, requires that the gas spring mounting be able to withstand shear forces brought about by loads incurred when the cab enclosure is in the tilt-back position. The shear forces on the gas spring mounting may require additional structural integrity to eliminate damage or possible failure, increasing the cost and weight of the machine.

Additionally, some designs, such as that shown in U.S. Pat. No. 5,547,244 issued to Seung K. Lee on Mar. 14, 1989 utilize an interlocking ring connected to a body of the machine for holding a canopy against pivotal movement. Upon movement from a closed position, the interlocking ring is engaged with an interlocking lug of a hinge block which is connected on the canopy for holding the canopy in an open position. A stopper is used to contact the hinge block as the canopy is pivoted to the open position. The engagement of the interlocking ring with the interlocking lug of the hinge block is not automatic and requires manual assistance. Further, a portion of the loads incurred when the canopy is in the open position may place a shear force on the gas spring mounting or the hinge block mounting which may promote damage or possible failure.

The present invention is directed to overcoming the problems as set forth above.

DISCLOSURE OF THE INVENTION

In one aspect of the present invention, a hold-open mechanism is adapted for use with a canopy of a work machine having a frame. The canopy is connected to and operatively associated with a lift cylinder for movement between open and closed positions. The hold-open mechanism comprises a support block fixedly secured to the frame of the work machine and a wedging block fixedly secured to the canopy. A bracket is releasably connected to the support block. A prop device is supported by the bracket and includes a bar with first and second end portions. The prop device is movable between a resting location wherein the canopy is in the closed position in a contacting relationship with the bar and a working location wherein the first end portion of the bar is seated on the support block and the second end portion of the bar is in abutment with the wedging block for holding the canopy in the open position.

In another aspect of the invention, a work machine is disclosed to have a frame. The work machine comprises a canopy pivotally mounted on the frame, an extendable lift cylinder, and a hold-open mechanism. The lift cylinder has first and second end portions with the first end portion being releasably connected to the frame of the work machine and the second end portion being releasably connected to the canopy. The lift cylinder is operatively associated with the canopy for moving the canopy between closed and open positions. The hold-open mechanism includes a support block fixedly secured to the frame of the work machine, a wedging block fixedly secured to the canopy, a bracket releasably connected to the support block, and a prop device supported by the bracket. The prop device has a bar with first and second end portions and is movable between a resting location wherein the canopy is in the closed position and a working location wherein the first end portion of the bar is seated on the support block and the second end portion of the bar is in abutment with the wedging block for holding the canopy in the open position.

In yet another aspect of the present invention, a method of holding a canopy of a skid steer loader machine in an open position and releasing the canopy from the open position to a closed position is disclosed. The method comprises the steps of fixedly securing a support block to a frame of the machine. Then, fixedly securing a wedging block to the canopy. Next, supporting a prop device on the support block. The prop device has a bar with first and second end portions and is biased toward a predetermined working location from a predetermined resting location. Then, locating the canopy in the closed position wherein the canopy is in contacting relationship with the bar and provides a force thereagainst so that the prop device is held in the resting location against the biasing action. Next, pivoting the canopy from the closed position to the open position wherein the prop device is automatically biased to the working location when the canopy is moved out of contacting relationship with the bar. The working location includes that the first end portion of the bar is seated on the support block and the second end portion of the bar is in abutment with the wedging block for holding the canopy in the open position. Then, pivoting the canopy beyond the open position prior to moving the prop device from the working location to the resting location against the biasing action. Next, holding the prop device in the resting location and simultaneously pivoting the canopy to the closed position. Finally, releasing the prop device when the canopy is in contacting relationship with the bar to provide a force thereagainst so that the prop device is held in the resting location against the biasing action.

The present invention is a hold-open mechanism for a canopy of a machine. The mechanism incorporates a prop device which has a bar. The movement of the canopy from a closed position to an open position automatically allows the bar to be biased from a resting location to a working location wherein the bar is wedged between a support block secured to a frame of the machine and a wedging block secured to the canopy. The bar is seated on the support block so that loads incurred when the canopy is in the open position are carried by the support block and transferred into the frame, eliminating shear forces on pins, bolts, and the like.

BEST MODE FOR CARRYING OUT THE INVENTION

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring to FIGS. 1–6, a work machine 10, such as a skid steer loader, is shown incorporating a hold-open mechanism 20 in accordance with the present invention. The skid steer loader 10 includes a machine frame 24 with front and rear end portions 28,32 supported for travel by a plurality of wheels 36. The frame 24 includes left and right upright tower assemblies, with only the left tower assembly being shown at 42, which are positioned on the rear end portion 32 thereof. The left and right tower assemblies are connected by upper and lower channel-shaped crossmembers, with only the upper crossmember being shown at 46, as seen best in FIG. 4. The upper crossmember 46 has an angularly inclined front surface 50.

Figure 1:
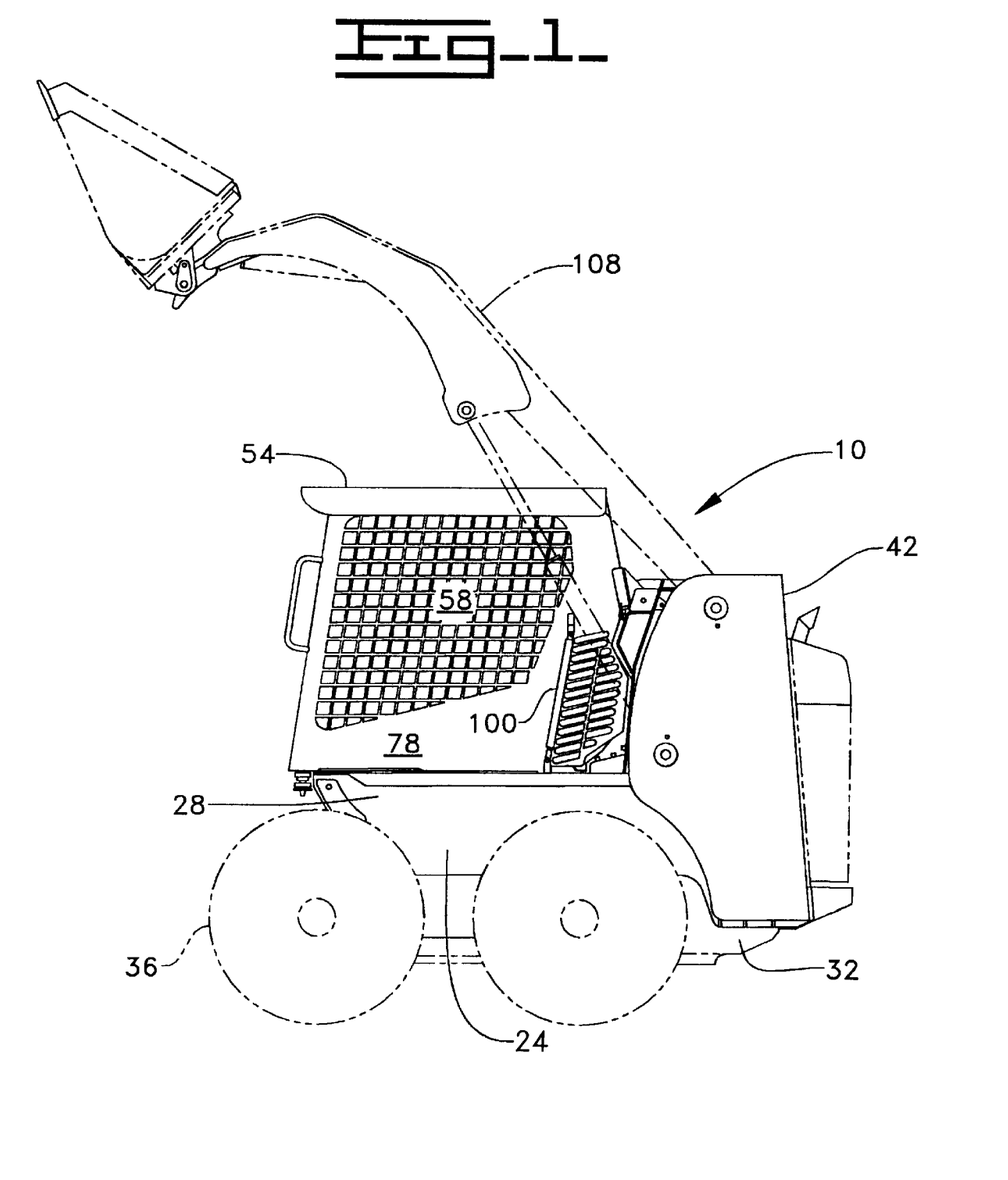
FIG. 1 is an illustration of a skid steer loader machine which includes a hold-open mechanism in accordance with the present invention.
Figure 2:
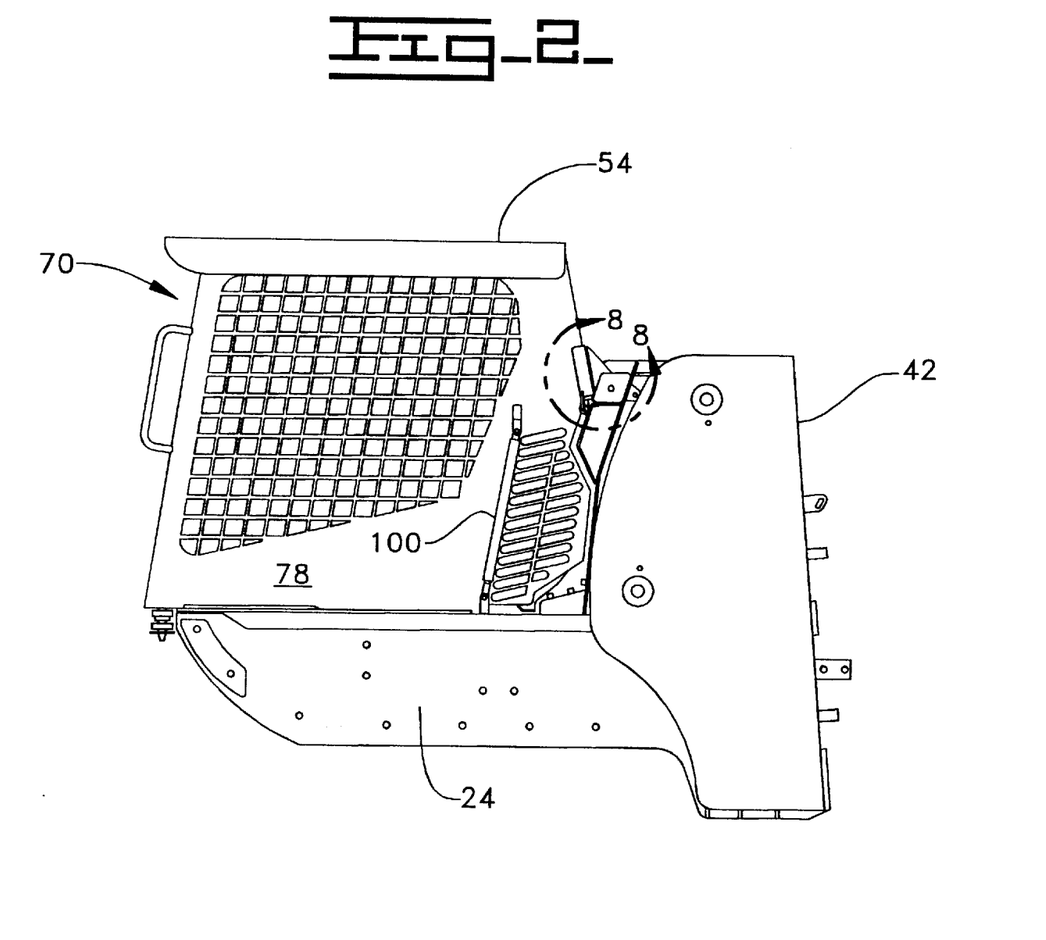
FIG. 2 is a partially cut away side elevational view of the skid steer loader machine illustrating a frame and a canopy thereof with the canopy in a closed position.
Figure 3:
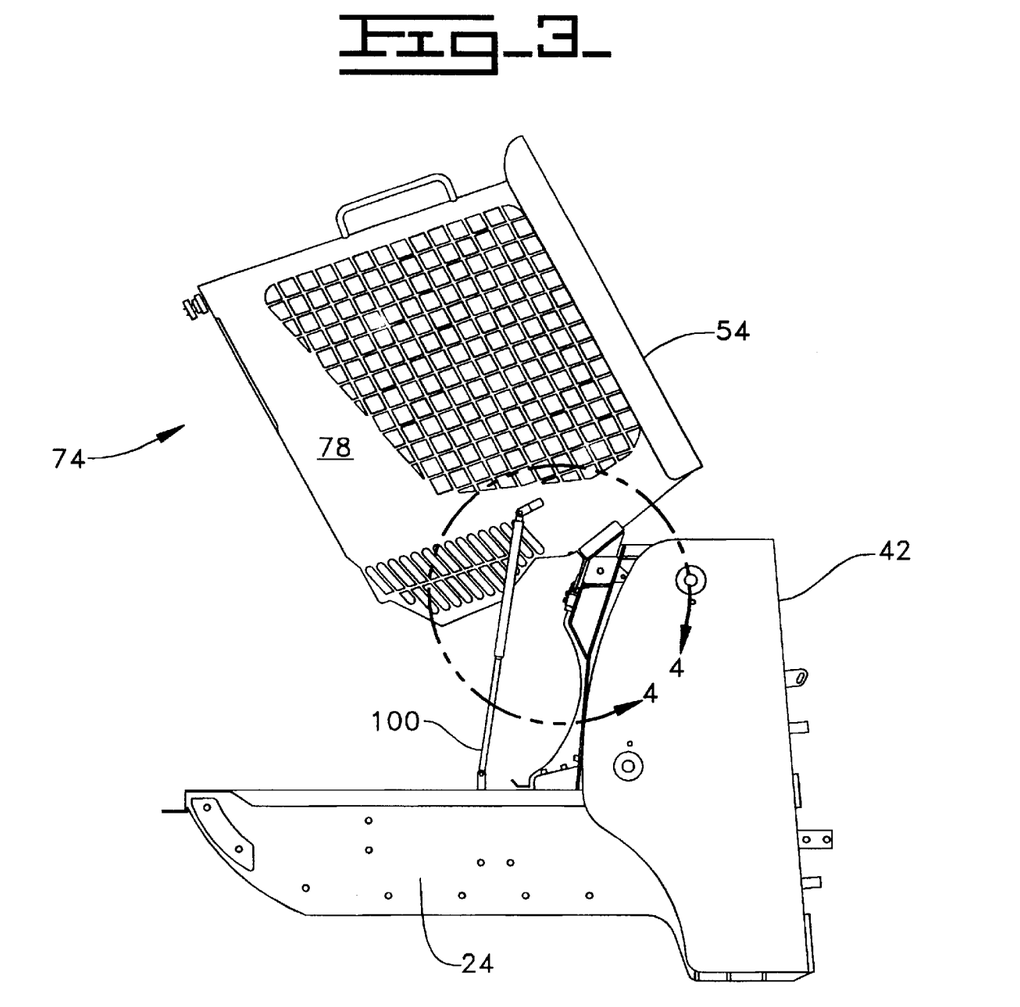
FIG. 3 is a side elevational view similar to FIG. 2 but illustrating the canopy in an open position.
Figure 6:
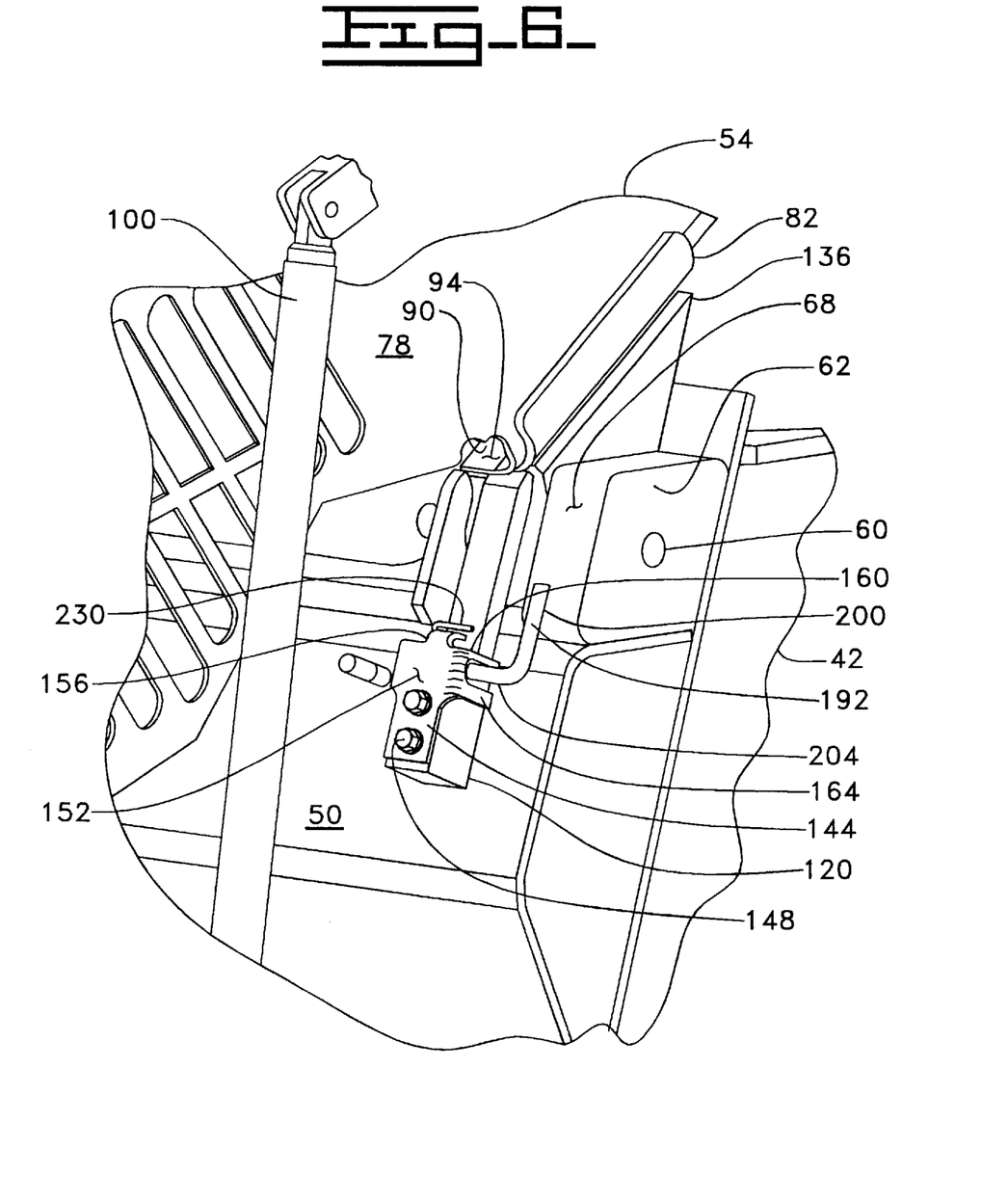
FIG. 6 is an enlarged cut-away perspective view illustrating the hold-open mechanism in more detail.
Figure 7:
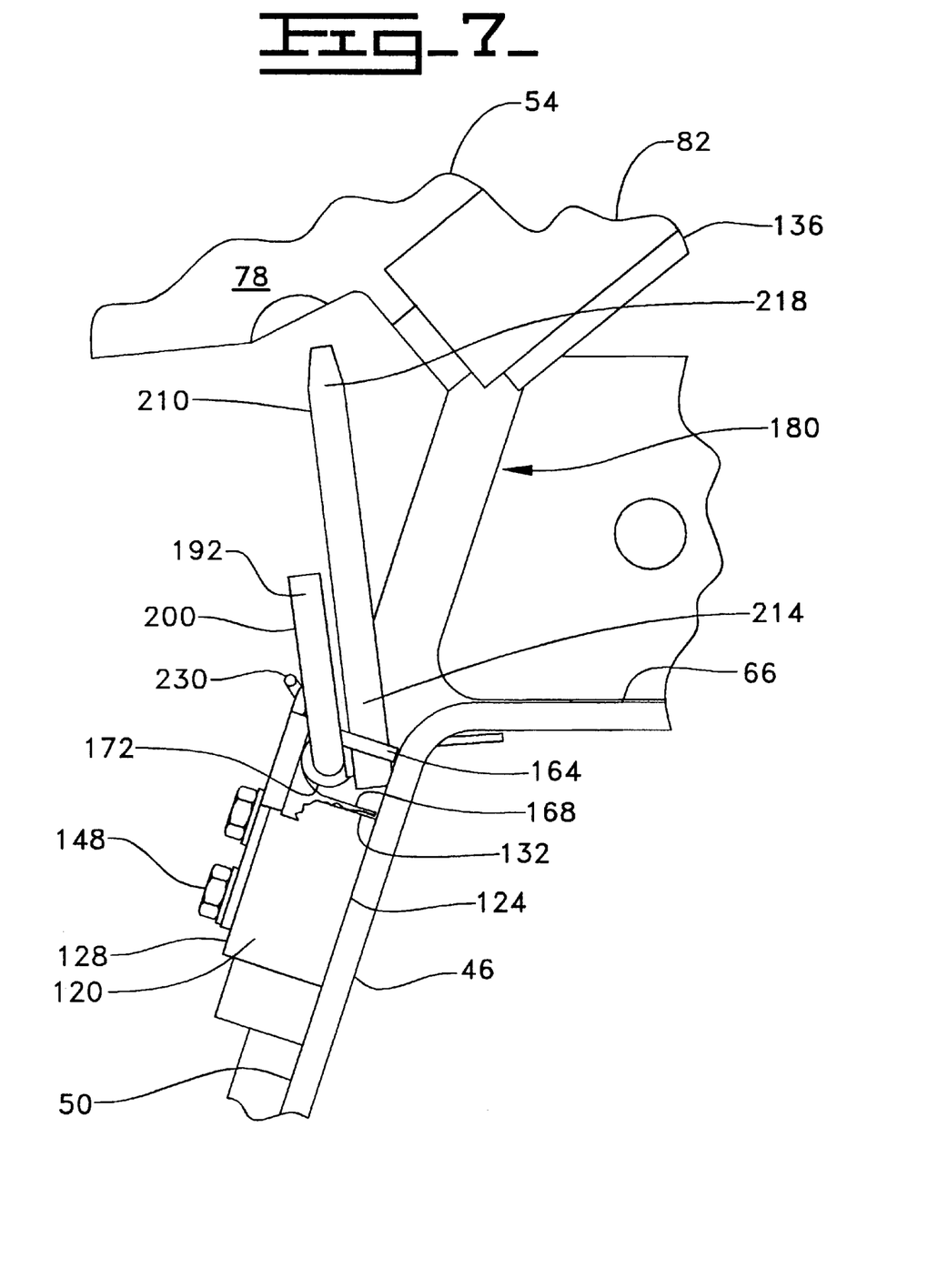
FIG. 7 is a side elevational view similar to FIG. 3 but illustrating the movement of a prop device of the hold-open from a working location to a resting location.

A canopy 54, or, overhead structure of any suitable design, is releasably secured on the front end portion 28 of the frame 24 in any suitable manner, such as bolting, for partially enclosing an operator (not shown) within an operating compartment 58 during operation of the loader machine 10. The canopy 54 is pivotably mounted by a pair of pin joints, one of which is shown at 60, to a boss 62 welded at an upper surface 66 of the upper crossmember 46. The boss 62 has an angularly inclined front surface 68 which is substantially aligned with the front surface 50 the of upper crossmember 46. The canopy 54 is positioned between the left and right tower assemblies and is movable between closed and open positions 70,74, as seen in FIGS. 2–3, respectively. The canopy 54 has a pair of side panels, one of which is shown at 78, with a reinforcing portion 82 at an outermost edge thereof adjacent the pivot joint 60, as seen best in FIG. 4. Referring more specifically to FIG. 6, the side panel 78 includes an interior compartment 90 adjacent the reinforcing portion 82. The interior compartment 90 is formed by a wall 94 of the side panel 78 which curves inwardly toward the operating compartment 58 of the loader machine 10. A gas-charged lift cylinder 100, which operates in a well-known manner, is connected at a first end to the frame 24 and at a second end to the canopy 54 for mechanically assisting the pivotal movement of the canopy 54. Left and right liftarm assemblies, with only the left liftarm assembly being shown at 108, are pivotally mounted to the respective corresponding left and right tower assemblies for movement between lowered and raised positions.

Figure 4:
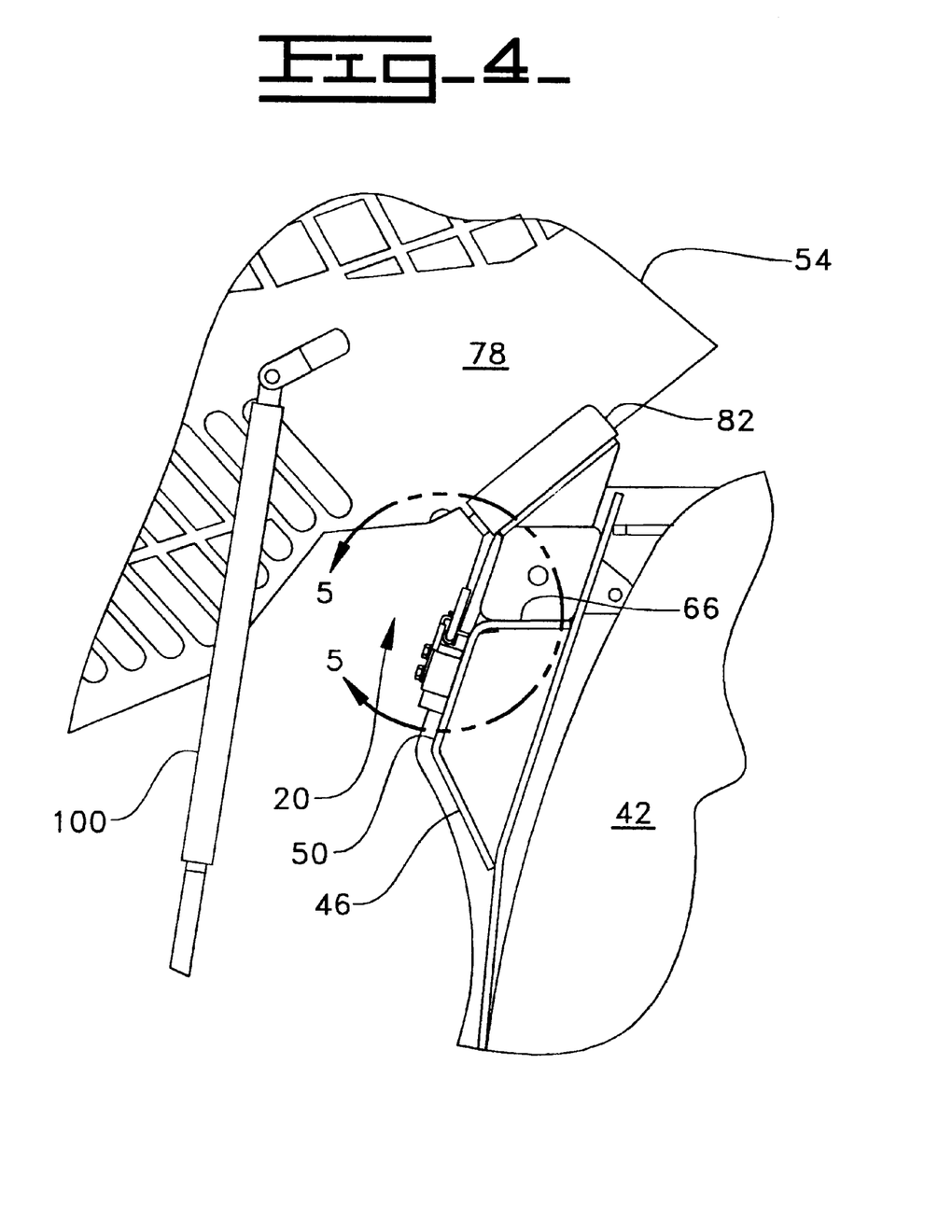
FIGS. 4–5 are enlarged views taken along lines 4—4 and 5—5 in FIGS. 3–4, respectively, which closely illustrates the hold-open mechanism.
Figure 5:
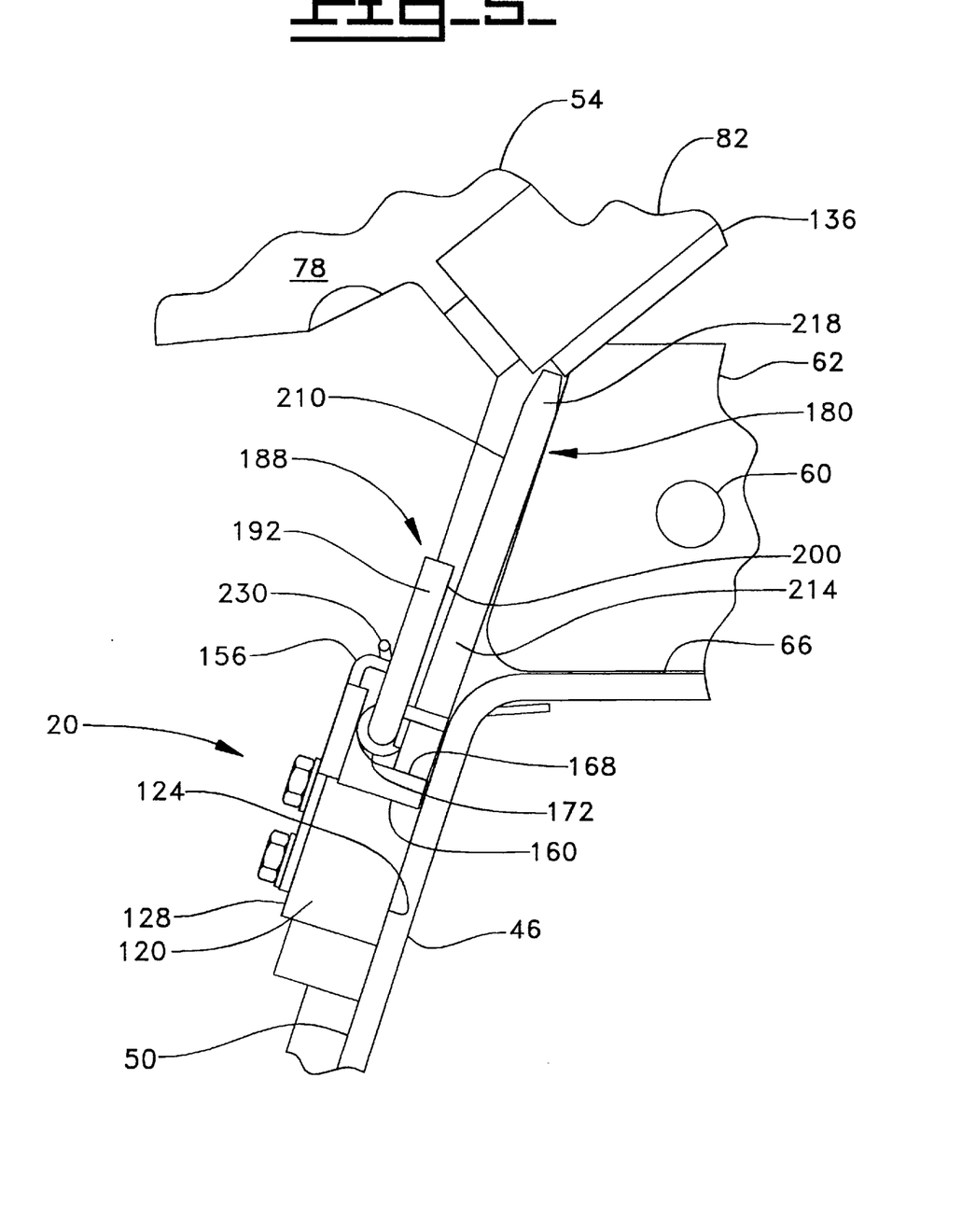

The hold-open mechanism 20 is shown in more detail in FIGS. 4–6. It should be understood that although the hold-open mechanism 20 is shown only on the left side of the loader machine 10, it may be utilized on the right side of the loader machine 10 and still be within the scope of the invention. A support block 120 is welded at a mounting surface 124 to the front surface 50 of the upper crossmember 46 and extends forwardly therefrom. The support block 120 has a front surface 128 opposite the mounting surface 124 which is angular inclined to maintain a substantially parallel relationship with the front surfaces of the upper crossmember and boss 50,68, respectively, and an upper surface 132. A wedging block 136 is welded on the side panel 78 of the canopy 54 at the reinforcing portion 82 and extends therefrom. A bracket 144 is releasably connected by a pair of bolts 148 to the front surface 128 of the support block 120. The bracket 144 includes a planar body portion 152 seated against the front surface 128 of the support block 120 with a width substantially equal to the width of the support block 120. The body portion 152 extends a predetermined distance upwardly from the support block 120 and terminates at a head portion 156 which curves inwardly a predetermined distance toward the upper crossmember 46. The head portion 156 has a smaller width than the body portion 152. A pair of arms 160 extend perpendicularly from the body portion 152 adjacent the upper surface 132 of the support block 120. The arms 160 are spaced at a width which is slightly greater than the width of the body portion 152. One of the pair of arms 160 has a pair of fingers 164 separated by a slotted open region 168 therebetween. The other of the pair of arms 160 has an opening 172 therethrough.

Figure 8:
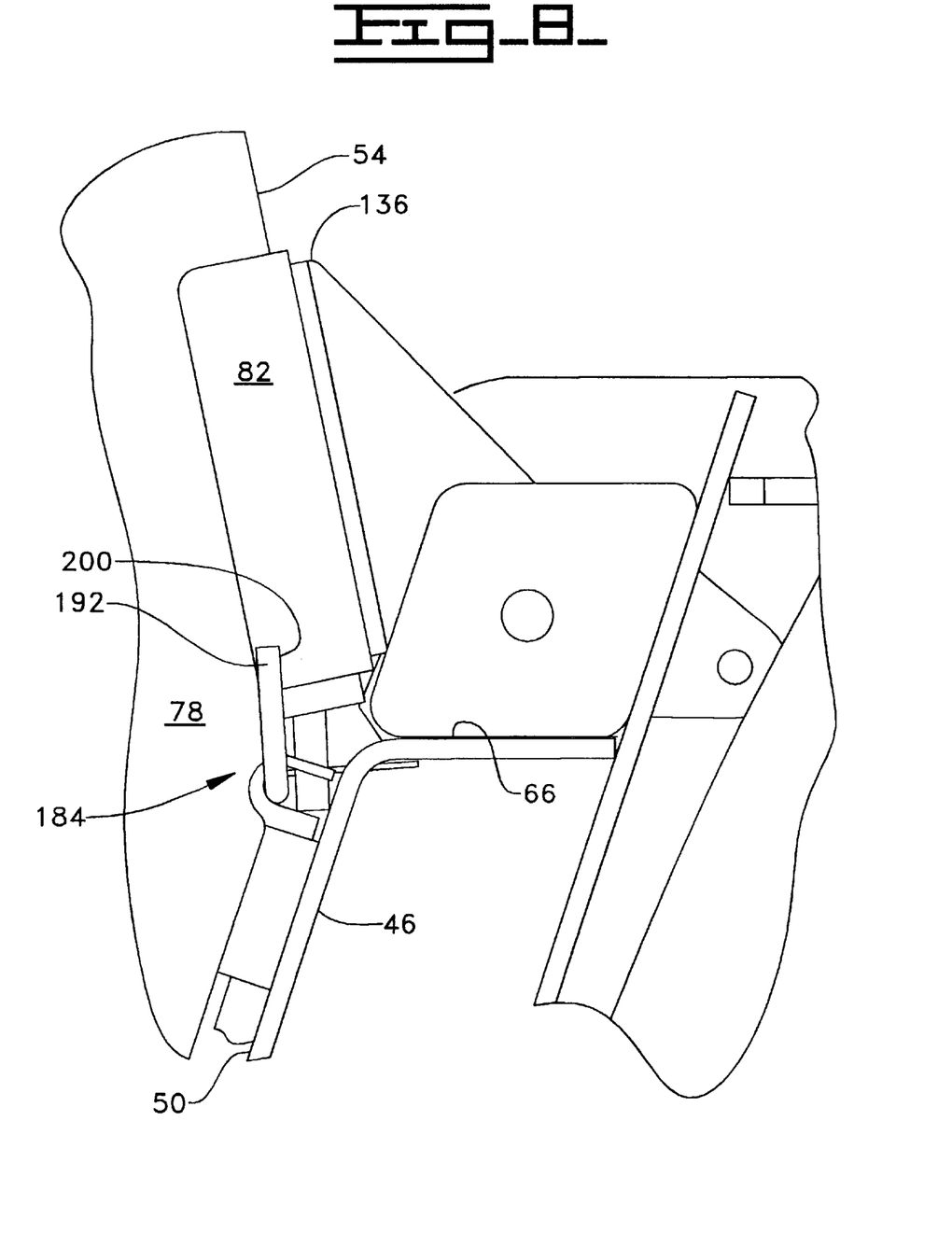
FIG. 8 is an enlarged view taken along line 8—8 in FIG. 2 which closely illustrates the hold-open mechanism.

The hold-open mechanism 20 includes a prop device 180 movable between a resting location 184 and a working location 188, seen in FIGS. 8 and 5, respectively. The prop device 180 includes a L-shaped lever 192 wherein the shorter leg defines a handle portion 200 and the longer leg defines an connecting portion 204 supported within the slotted open region 168 and opening 172 and positioned slightly above the upper surface 132 of the support block 120. A prop bar 210 is connected to the L-shaped lever 192 and positioned between the arms 160. The bar 210 has first and second end portions 214,218 with the first end portion 214 being seated on the support block 120.

A spring 230 of any suitable type is connected between the head portion 156 of the bracket 144 and the bar 210 for biasing the prop device 180 toward the working location 188, as seen best in FIG. 5.

Industrial Applicability

While the canopy 54 is in the closed position 70, the bar 210 of the prop device 180 is in the resting location 184, as seen in FIG. 8. In the resting location 184, the bar 210 abuts the head portion 156 of the bracket 144 and is angularly disposed from the seating surface 66. A portion of the bar 210 is encompassed by the interior compartment 90 of the canopy 54 and partially hidden from view. The wall 94 of the side panel 78 which forms the interior compartment 90 contacts the bar 210 and exerts a force thereon against the biasing action of the spring 230 so that the prop device 180 remains in the resting location 184 while the canopy is closed.

In order to hold the canopy 54 in the open position 74 to accommodate maintenance or repair of the loader machine 10, the canopy 54 is unbolted from the frame 24 and manually pivoted from the closed position 70 to the open position 74. During the pivoting movement, the wall 94 of the side panel 78 moves out of contact with the bar 210. At that moment, the spring 230 automatically biases the prop device 180 toward the working location 188. Due to the widths and locations of the components, the bar 210 is free to move between the arms 160 of the bracket 144 a predetermined distance away from the head portion 156 in response to the biasing action of the spring 230. In the working location 188, the length of the bar 210 is seated substantially flush against the front surface 50 of the cross-member 46 and parallel with the boss 62 and spaced therefrom. The first end portion 214 of the bar 210 is seated substantially flush against the upper surface 132 of the support block 120. The second end portion 218 of the bar 210 abuts the wedging block 136 to support the canopy 54 in the open position 74.

In order to release the prop device 180 and pivot the canopy 54 from the open position 74 to the closed position 70, the canopy 54 is manually pivoted slightly beyond the open position 74. At the same time, the handle portion 200 of the L-shaped lever 192 is used to move the prop device 180 from the working location 188 to the resting location 180 against the biasing action of the spring 230. The bracket 144 is positioned to properly locate the bar 210 with respect to the interior compartment 90 when the bar 210 is brought into abutment with the head portion 156. The prop device 180 is manually held in the resting location 184 while the canopy 54 is pivoted toward the closed position 70. During the pivoting movement, the wall 94 of the side panel 90 eventually contacts the bar 210 of the prop device 180 to retain the prop device 180 in the resting location 184, as described above.

The automatic biasing of the prop device 180 to the working location 184 effectively retains the canopy 54 in the open position 74 with minimal operator involvement. Further, the seating of the bar 180 on the support block 120 while the canopy 54 is in the open position 74 ensures that forces exerted by the weight of the canopy 54 are transferred to the frame 24 of the loader machine 10 so that shear forces on pins and bolts are eliminated. The partially hidden bar 210 of the prop device 180 provides aesthetically enhanced componentry with high structural integrity. Additionally, the dual function of the bracket 144, as both a support and locating device for the prop device 180, provides a cost-effective hold-open mechanism 20.

Other aspects, objects and advantages of this invention can be obtained from a study of the drawings, disclosure and the appended claims.

What is claimed is:

1. A hold-open mechanism adapted for use with a canopy of a work machine having a frame, the canopy being connected to and operatively associated with a lift cylinder for movement between open and closed positions, comprising:

a support block fixedly adapted to be secured to the frame of the work machine, the support block having a front surface and an upper surface;

a wedging block fixedly adapted to be secured to the canopy;

a bracket having a planar body portion releasably connected to the support block, a pair of spaced arms extending perpendicular from the body portion, and a curved head portion extending from the body portion between the pair of spaced arms; and a prop device supported by the bracket and having a bar with first and second end portions, the prop device being movable between a resting location wherein the canopy is in the closed position in a contacting relationship with the bar and a working location wherein the first end portion of the bar is seated on the support block and the second end portion of the bar is in abutment with the wedging block for holding the canopy in the open position with the curved head portion of the bracket being spaced a predetermined distance from the bar when the prop device is in the working location and being in contact with the bar when the prop device is in the resting location.

2. The hold-open mechanism of claim 1, wherein the prop device is automatically biased to the working location when the canopy is moved from the closed position to the open position.

3. The hold-open mechanism of claim 1, including a spring operatively associated with the bracket for automatically biasing the prop device toward the working location when the canopy is moved from the closed position to the open position.

4. The hold-open mechanism of claim 3, wherein the prop device includes a lever fixedly connected to the bar wherein movement of the lever forces the bar against the biasing action of the spring so that the prop device is moved from the working location to the resting location prior to the canopy being moved from the open position to the closed position.

5. The hold-open mechanism of claim 1, wherein loads which occur when the canopy is in the open position are transferred through the bar of the prop device into the support block.

6. The hold-open mechanism of claim 1, wherein the arms of the bracket are spaced to accommodate the width of the bar of the prop device and support a portion of the prop device so that during movement of the prop device the bar thereof is free to move between the arms of the bracket for contacting the head portion of the bracket at a predetermined location on the work machine with respect to the canopy.

7. The holde-pen mechanism of claim 1, wherein a portion of the prop device is disposable within an interior compartment of the canopy while in the resting location.

8. A work machine having a frame, comprising:

a canopy pivotally mounted on the frame;

an extendable lift cylinder with a first end being releasably connected to the frame of the work machine and a second end being releasably connected to the canopy, the lift cylinder being operatively associated with the canopy for moving the canopy between closed and open positions; and a hold-open mechanism including a support block fixedly secured to the frame of the work machine, a wedging block fixedly secured to the canopy, a bracket releasably connected to the support block, and a prop device supported by the bracket, the prop device having a bar with first and second end portions and being movable between a resting location wherein the canopy is in the closed position and a working location wherein the first end portion of the bar is seated on the support block and the second end portion of the bar is in abutment with the wedging block for holding the canopy in the open position.

9. The work machine of claim 8, wherein the prop device is automatically biased to the working location when the canopy is moved from the closed position to the open position.

10. The work machine of claim 8, including a spring operatively associated with the bracket for biasing the prop device toward the working location when the canopy is moved from the closed position to the open position.

11. The work machine of claim 10, wherein the prop device includes a lever fixedly connected to the bar wherein movement of the lever forces the bar against the biasing action of the spring so that the prop device is moved from the working location to the resting location prior to the canopy being moved from the open position to the closed position.

12. The work machine of claim 11, wherein the support block has a front surface and an upper surface and the bracket has a planar body portion releasably connected to the front surface of the support block, a pair of spaced arms extending perpendicular from the body portion and adjacent the upper surface of the support block, and a curved head portion extending from the body portion between the pair of spaced arms, the curved head portion of the bracket spaced a predetermined distance from the bar when the prop device is in the working location and in contact with the bar when the prop device is in the resting location.

13. The work machine of claim 12, wherein the arms of the bracket are spaced to accommodate the width of the bar of the prop device and support the lever of the prop device so that during movement of the prop device the bar thereof is free to move between the arms of the bracket for contacting the head portion of the bracket at a predetermined location on the work machine with respect to the canopy.

14. The work machine of claim 8, wherein the canopy has an interior compartment which substantially encompasses the bar of the prop device when the prop device is in the resting location and provides a force against the bar for holding the prop device in the resting location against the biasing force of the spring.

15. The work machine of claim 13, wherein the canopy has an interior compartment and movement of the canopy from the open position to the closed position is initiated when the bar of the prop arm is in the predetermined location of the work machine so that the interior compartment of the canopy substantially encompasses the bar of the prop device and provides a force thereagainst for holding the prop device in the resting location against the biasing force of the spring.

16. A method of holding a canopy of a skid steer loader machine in an open position and releasing the canopy from the open position to a closed position, comprising the steps of:

fixedly securing a support block to a frame of the machine;

fixedly securing a wedging block to the canopy;

supporting a prop device on the support block, the prop device having a bar with first and second end portions and being biased toward a predetermined working location from a predetermined resting location;

locating the canopy in the closed position wherein the canopy is in contacting relationship with the bar and provides a force thereagainst so that the prop device is held in the resting location against the biasing action;

pivoting the canopy from the closed position to the open position wherein the prop device is automatically biased to the working location when the canopy is moved out of contacting relationship with the bar, the working location including that the first end portion of the bar is seated on the support block and the second end portion of the bar is in abutment with the wedging block for holding the canopy in the open position;

pivoting the canopy beyond the open position prior to moving the prop device from the working location to the resting location against the biasing action;

holding the prop device in the resting location and simultaneously pivoting the canopy to the closed position; and releasing the prop device when the canopy is in contacting relationship with the bar to provide a force thereagainst so that the prop device is held in the resting location against the biasing action.

17. The method of holding the canopy in the open position as in claim 16, including the step of:

providing the canopy with an interior compartment which substantially encompasses the bar of the prop device when the prop device is in the resting location.

18. The method of holding the canopy in the open position as in claim 16, including the step of:

transferring loads incurred on the bar of the prop device when the canopy is in the open position into the support block through the seating of the bar thereon.

* * * * *